(12) United States Patent
Browne et al.

(10) Patent No.: US 7,370,820 B2
(45) Date of Patent: May 13, 2008

(54) METHOD AND SYSTEM FOR HARVESTING WEIGHTING AGENT FINES

(75) Inventors: Neale Browne, Houston, TX (US); Mukesh Kapila, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 482 days.

(21) Appl. No.: 11/046,983

(22) Filed: Jan. 31, 2005

(65) Prior Publication Data

US 2006/0169809 A1    Aug. 3, 2006

(51) Int. Cl.
*B02C 19/00* (2006.01)

(52) U.S. Cl. .......................... 241/24.1; 241/29; 241/79; 241/80

(58) Field of Classification Search ................ 241/29, 241/24.1, 80, 79; 507/904, 906, 140, 269
See application file for complete search history.

(56) References Cited

U.S. PATENT DOCUMENTS

| 6,180,573 | B1 | 1/2001 | Nattier et al. |
| 6,548,452 | B1 | 4/2003 | Nattier et al. |

*Primary Examiner*—Mark Rosenbaum

(57) ABSTRACT

A method for harvesting weighting agent fines includes milling weighting agent into a plurality of pieces, classifying the pieces based on size to extract those particles having a particle size less than an acceptable maximum diameter, reclassifying the pieces based on size to extract those particles having a particle size less than an acceptable minimum diameter, collecting the particles having a particle size between the standard acceptable minimum and maximum diameters, and collecting the particles having a particle size less than the acceptable minimum diameter. A system for harvesting weighting agent fines includes a mill to reduce the weighting agent particle size, a first classifier to extract particles having a particle size less than the acceptable maximum diameter, a second classifier to extract particles having a particle size less than the acceptable minimum diameter, a fine particle collection area, and a coarse particle collection area.

14 Claims, 7 Drawing Sheets

METHOD AND SYSTEM FOR HARVESTING WEIGHTING AGENT FINES

BACKGROUND OF INVENTION

A variety of materials are used to increase the density of well bore fluids. Well bore fluids are used for well bore stability, control the flow of gas, oil or water from the formation in order to prevent, for example, the flow or blow out of formation fluids or the collapse of the formation itself. Conventional weighting agents such as powdered barites and calcium carbonates (d50 10-30 μm) will settle in minutes over several inches when mixed with a carrier fluid such as water or oil. This can be largely predicted by Stokes Law. Therefore, in order to suspend the weighting agent particles, a gellant such as bentonite or a soluble polymer such as xanthan gum may be used to increase the viscosity of the carrier fluid. However, as more gellant is added to increase the suspension stability, the fluid viscosity (plastic viscosity) increases undesirably resulting in reduced pump ability among other fluid mechanical properties.

The sedimentation (or "sag") of particulate weighting agents becomes more critical in well bores drilled at high angles from the vertical. For example, sag of one inch can result in a continuous column of reduced density fluid along the upper portion of the well bore wall. Such high angle wells are frequently drilled over large distances in order to access remote portions of an oil reservoir. In this case, it becomes even more critical to minimize a drilling fluid's plastic viscosity in order to reduce the pressure losses over the borehole length. This is also important in deep high pressure wells where high density well bore fluids are required. High viscosities can result in an increase in the effective density exerted by a circulating fluid against the formation, accounting for the pressure drop in the annulus above the point being considered, or the Equivalent Circulating Density. Such high viscosities can result in formation damage and fluid losses.

The conventional view held that reducing particle size in drilling fluids would lead to an undesirable increase in viscosity. However, it was determined that very finely ground particles (d50<2 μm and d90<4 μm) coated with a deflocculating agent or dispersant generated suspensions or slurries that reduced sag while the dispersant controlled the inter-particle interactions that produced lower Theological profiles. Thus, the combination of the fine particle size and the control of colloidal interactions reconciled the two objectives of lower viscosity and minimal sag.

To date, such finely ground, coated particles have been produced using stirred media mills. It is known, however, that such finely ground particles are a natural, although undesirable, byproduct of regular API weighting agent production. According to current API standards, particles having a effective diameter less than 6 microns, also known as "fines," may make up no more than 30% by weight of the total weighting agent to be added to the drilling fluid. Thus, while it is acceptable to have fine particles in the weighting agent, it is preferred that the relative quantity of such particles be minimized. It would be beneficial to the production of the API weighting agent to harvest a substantial quantity of the fine particles created during production for use in a different product wherein such fine particles are desired.

A particle size distribution chart for the API weighting agent barite produced in a typical process is shown in FIG. 1. As can be seen within circle 600, nearly a third of the particles have a particle size of less than 6 μm. From a careful examination of the chart, one of skill in the art can see that particles less than 4 μm in size make up approximately 18% of the API Barite produced in this particular run. Thus, there exists a percentage of barite that is usable in alternative drilling fluids if it were separated from the API Barite. Such separation would simultaneously improve the quality of the API Barite, as the existence of such fine particles is undesirable in regular drilling fluids.

The concentration of fines in typical non-deviated drilling applications is problematic. An increase in fines results in an increase in chemical consumption for virgin drilling fluids, undesirable Theological properties while drilling, increased fluid loss, and increased reliance on mechanical separation equipment and ongoing dilution rates while drilling. This is universal for both water and oil or synthetic based drilling fluids. Therefore, the removal of fines is desirable. Such a low concentration of fines could reduce drilling costs, increase rate of penetration, reduce drag and incidents of stuck pipe.

Referring to FIG. 2, a typical process 500 for the production of commercial-grade weighting agent is depicted. Commercial-grade weighting agent is defined as weighting agent a maximum of 30% by weight of particles less than 6 microns and a maximum of 3% by weight of residue greater than 75 microns. The minimum effective diameter that weighting agent particles are permitted by API standards will be referred to hereinafter as the "minimum acceptable diameter." The maximum effective diameter that weighting agent particles are permitted by API standards will be referred to hereinafter as the "maximum acceptable diameter." It will be understood that the minimum and maximum acceptable diameters are determined by the API standards and do not reflect control limits as determined by statistical process control of an ongoing process.

In a precrushing step 510, relatively large pieces of weighting agent, typically barite or calcium carbonate, are released into a primary crusher to reduce the size of the larger pieces thereby obtaining a more uniform particle size going into the downstream processes. From the primary crusher, the particles are milled 520. Heat and additional crushing devices are used to reduce moisture and the particle size of the weighting agent even further. Typically, the secondary crusher utilizes heavy rollers that pulverize the weighting agent against an outer wall of the crusher.

The milled weighting agent is classified by size 530 in a classifier internal to the mill. Particles that have a size exceeding the acceptable maximum diameter remain in the mill for further milling 520. The particles that are less than the maximum size specified for commercial-grade weighting agent are discharged from the internal mill classifier 540 to a cyclone. The weighting agent entering the cyclone includes a relatively low concentration of undersized particles, known as "fines."

In the cyclone, the larger, heavier particles fall to the bottom, where there is typically a rotary air lock valve, dual flapper gate valves, or other means for discharging predetermined quantities of weighting agent particles 550 separated in the cyclone. Some of the undersized fine particles, or fines, are carried to the bottom of the cyclone by larger particles to which the fines are attached or fall there individually. Predetermined quantities of weighting agent are released from the cyclone in bulk to a conveyer belt either periodically, such as by the rotary valve, or when the amount of weighting agent reaches sufficient weight, such as that needed to open the dual flapper gate valves.

A majority of the fines, are carried along with air currents from the cyclone into an adjacent baghouse rather than falling to the bottom of the cyclone. The baghouse retains a number of bags that filter the fine particles from air that is released from the process, thereby trapping the fine particles 560. At predetermined intervals, the bags are subjected to a sudden force that causes the fines collected thereon to be released to the bottom of the baghouse and onto the conveyer belt 570. The timing of the application of force necessary to release the fines is coordinated with the release of the larger particles from the cyclone to ensure that the overall quantity of weighting agent particles, coarse and fine, is within the tolerated limit of acceptable fines.

The discharge of larger weighting agent particles to the conveyor represents a majority of the overall flow rate onto the conveyor, while the discharge of fines to the conveyor represents a very small percentage of the flow rate on a mass basis. Although it is desirable to eliminate the fines from the commercial-grade weighting agent, disposal of the fines has heretofore been an issue environmentally and economically. The commercial-grade weighting agent released to the conveyor and the fines released to the conveyor are commingled and conveyed 580 to a packaging area where they are packaged 590 for distribution.

As commercial applications of fines have been discovered, processes to create fines from commercial-grade weighting agent or non-processed weighting agent have been evaluated. Given the fact that fine particles are created as part of the process to mill and package commercial-grade weighting agent, it would be an improvement to be able to modify existing processes and equipment to harvest a majority of the fines from the commercial-grade weighting agent process while producing a premium weighting agent product having a lower percentage of fines rather than reintroducing the fines to the commercial-grade weighting agent.

SUMMARY

In one aspect, the claimed subject matter is generally directed to a method for harvesting fines from a commercial-grade weighting agent production process. The method includes milling weighting agent into a plurality of weighting agent particles and then classifying the weighting agent particles according to size. Particles that are less than an acceptable maximum size are discharged to a cyclone where a portion of weighting agent particles having a particle size less than an acceptable minimum diameter for commercial-grade weighting agent are cyclonically removed from the discharged weighting agent particles. These fine weighting agent particles, or fines, are commingled in a controlled ratio with the remaining weighting agent. The commingled weighting agent is directed to a second classifier where it is then classified a second time to separate a coarse particle group from a fines particle group. The fines particle group is trapped in a baghouse and periodically released to a fines particle collection area. More than 98% of the particles in the fines particle group have a particle size less than the acceptable minimum diameter for commercial-grade weighting agent. The coarse particle group from the second classifier is collected in a coarse particle collection area. Less than 15% of the particles in the coarse particle group have a particle size less than the acceptable minimum diameter for commercial-grade weighting agent.

The coarse particle group may be packaged for use as a premium weighting agent weighting agent product. Similarly, the fines particle group may be packaged for further processing or use.

The separated larger particles from the cyclone may be collected immediately with only the cyclonically removed weighting agent particles having a particle size less than the acceptable minimum diameter for commercial-grade weighting agent being directed to the second classifier. These fine particles may include misclassified coarse particles, which are separated in the second classifier and collected. The fines particle group from the second classifier may be trapped in a second baghouse and periodically released to a fines collection area.

In an alternative method, weighting agent is milled and classified a first time, according to size, to retain large particles in the mill and discharge particles that are less than an acceptable maximum diameter. The particles that are less than an acceptable maximum diameter are classified again, according to size, into a coarse particle fraction group and a fine particle fraction group. The fine particle fraction group, which includes those particles that are below the acceptable minimum diameter, are directed to a high-efficiency cyclone where ultra-fine particles, having a particle size less than a predetermined minimum particle size for the fines particle group, are trapped in a baghouse. The cyclonically separated fines particle group is collected for further use or processing. The ultra fine particles may be added back to the fines particle group in a controlled manner such that the ratio of ultra fine particles to fine particles is within a predetermined range. The coarse particle group, which are those particles having a diameter between the standard acceptable minimum and the standard acceptable maximum are discharged from the second classifier into a coarse particle collection area.

In another illustrated aspect of the claimed subject matter, system for harvesting weighting agent fines for further use during production of commercial-grade weighting agent includes a mill, a first classifier, a cyclone, a second classifier, and a fine particle fraction group collection area.

The mill reduces weighting agent particles to a particle size less than an acceptable maximum diameter. The first classifier separates weighting agent particles having a particle size less than the acceptable maximum diameter and directs them to the second classifier.

The cyclone separates larger particles from fine particles and releases the larger particles to a collection area or to a conveyance mechanism. The fine particles are trapped in a baghouse and periodically released directly to the second classifier or to the conveyance mechanism where the larger and smaller particles are commingled in predetermined ratios.

The second classifier separates a fine particle group from a coarse particle group. The fine particle group includes those weighting agent particles having a particle size less than an acceptable minimum diameter. The fine particle group is collected for further use. The coarse particle group, which includes those particles having a particle size between the standard acceptable minimum and maximum diameters, are collected for packaging.

A precrusher may be included before the mill to reduce the weighting agent pieces to smaller, more uniform sizes to be introduced to the mill.

Other aspects and advantages of the claimed subject matter will be apparent from the following description and the appended claims.

DETAILED DESCRIPTION

Figure 1:
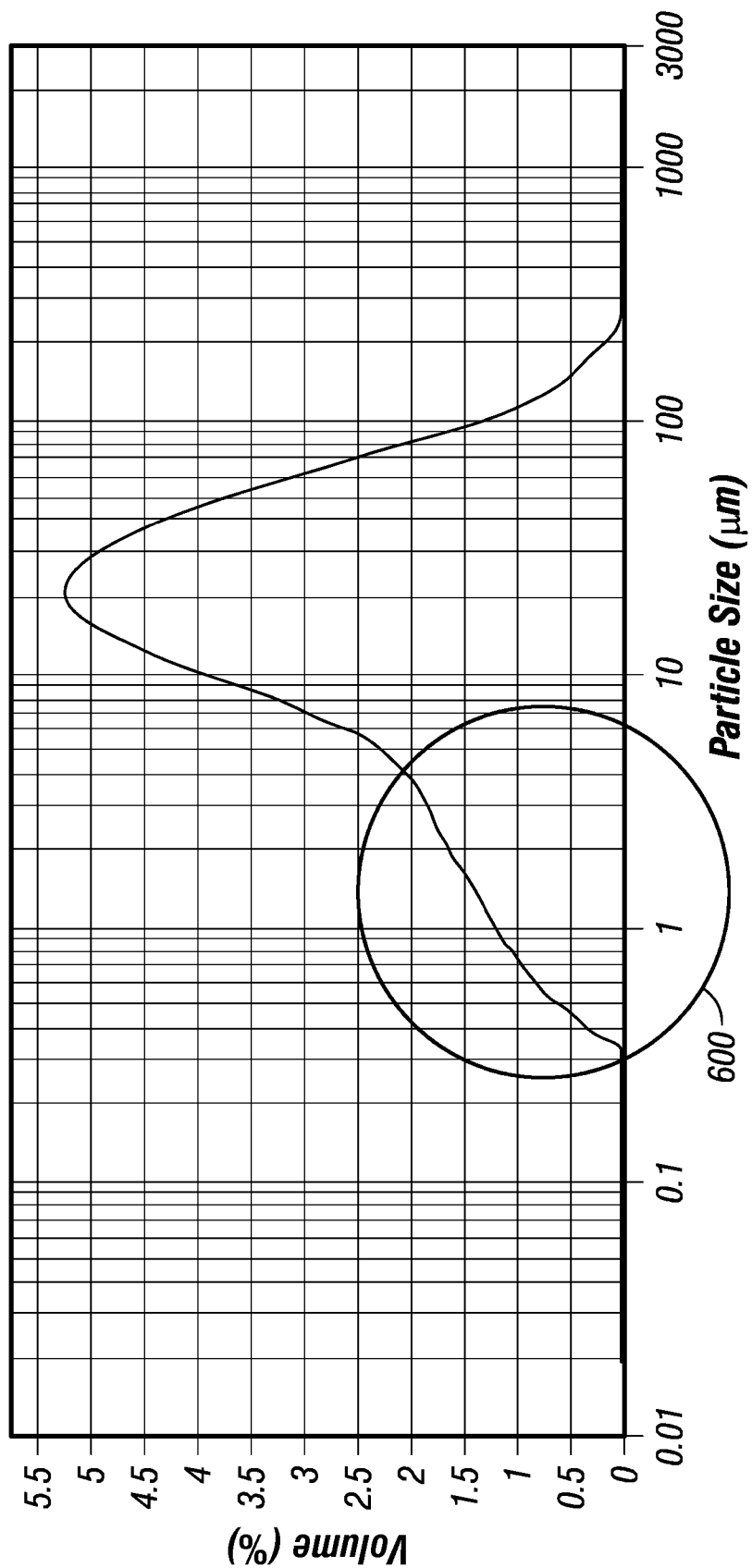
FIG. 1 is a particle size distribution chart for the API weighting agent barite.
Figure 2:
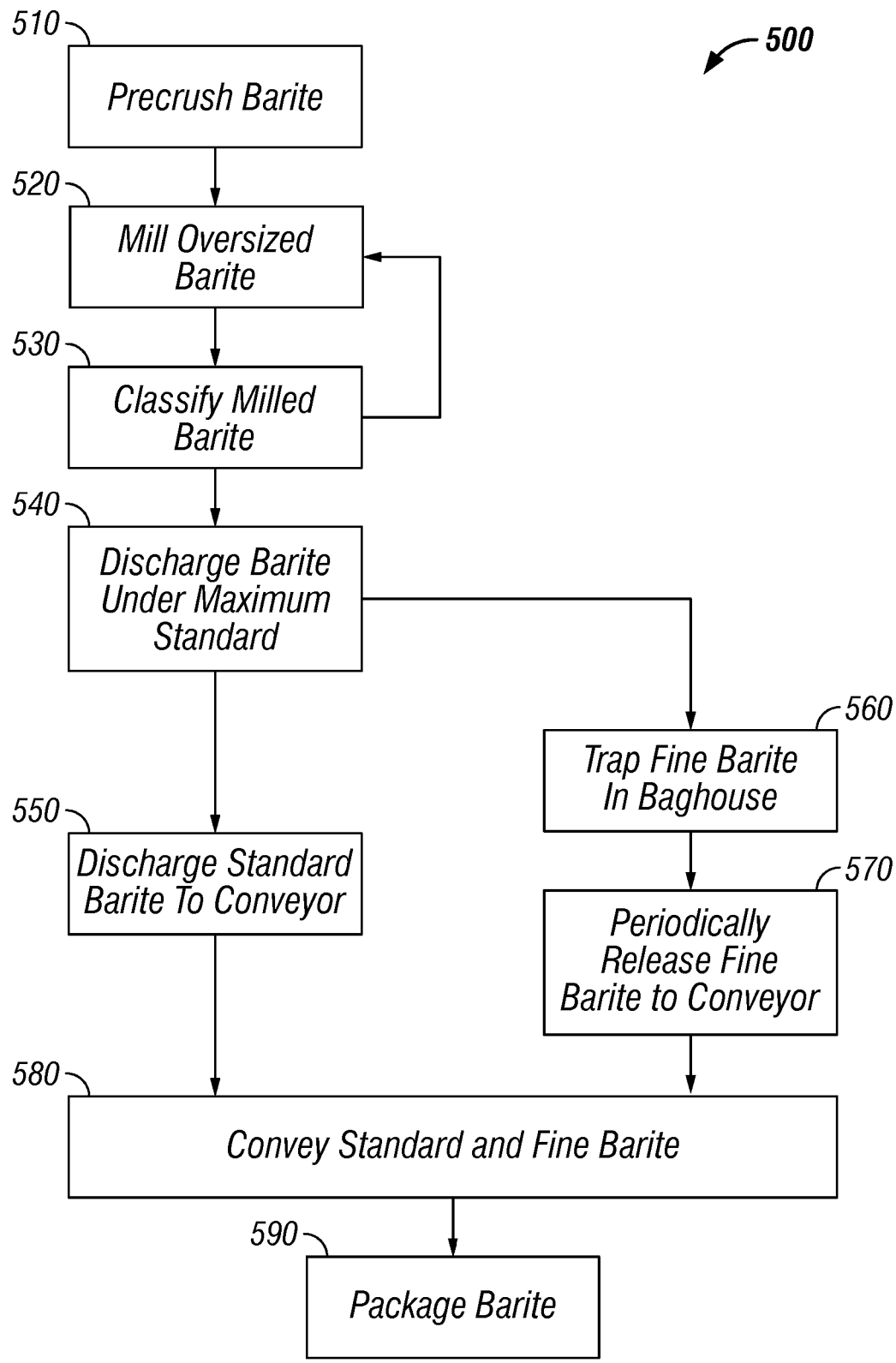
FIG. 2 is a flow chart showing the prior art production process of weighting agent used in drilling fluid.
Figure 3:
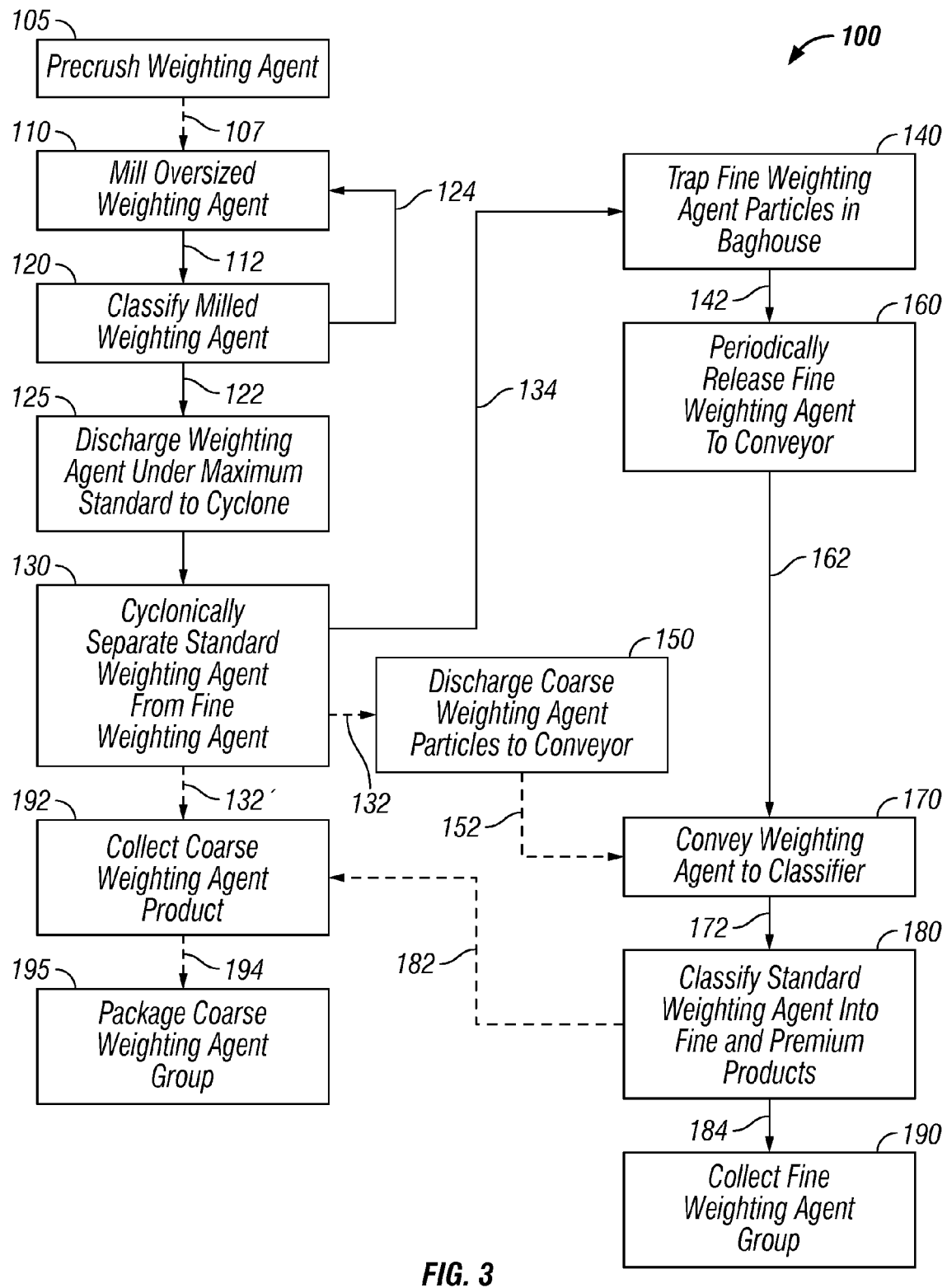
FIG. 3 is a flow chart showing a method of harvesting weighting agent fines from a production process.

The claimed subject matter relates to harvesting a fines fraction of weighting agent from a commercial-grade weighting agent process. A first method of harvesting fines 100 is depicted in FIG. 3.

The method 100 includes a milling step 110 in which weighting agent pieces are milled into a plurality of weighting agent particles 112. The weighting agent particles will be classified in a later step based upon the size of the particle diameter, which is hereinafter referred to as the "particle size." Thus, in the milling step 110, weighting agent is added to the mill, either in batches or continuously, to replace weighting agent particles separated by the classifier.

The weighting agent pieces introduced to the milling step 110 may first be subjected to a precrushing step 105. In the precrushing step, weighting agent is broken into weighting agent pieces 107 that can be handled by and fed into the mill. By first precrushing the weighting agent, the weighting agent pieces 107 introduced to the mill may be of a more uniform size than if the weighting agent were not precrushed and provides a more efficient milling step 110.

In a classifying step 120, the weighting agent particles 112 are separated into smaller weighting agent particles 122, defined as those particles having a particle size less than the acceptable maximum diameter, and larger particles 124, which remain in the milling step 110. The larger particles 124 continue in the milling step 110 until the particles 124 are reduced sufficiently in size to be classified as smaller particles 122.

The smaller weighting agent particles 122 are discharged to a cyclone 125. The smaller weighting agent particles 122 are then cyclonically separated by size 130, with lighter, fine weighting agent particles 134 being carried into a baghouse and heavier weighting agent particles 132, 132' falling to the bottom of the cyclone. The majority of the heavier weighting agent particles 132, 132' have a particle size greater than the acceptable minimum diameter and less than the acceptable maximum diameter. The majority of the fine weighting agent particles 134 have a particle size less than the acceptable minimum diameter. It is understood by those of skill in the art, that a quantity of the fine weighting agent particles may be attached to the larger weighting agent particles 132, 132' or are otherwise directed to the bottom of the cyclone with the larger weighting agent particles 132, 132'.

In a first embodiment of the process, the larger weighting agent particles 132 may be discharged periodically to an auger or other conveyance mechanism 150. The conveyed weighting agent particles 152 are then directed to a classifier 170.

The cyclonically separated fine weighting agent particles 134 are trapped in the baghouse 140. The trapped fine weighting agent particles 142 are periodically released 160 to a conveyance mechanism. The conveyed fine weighting agent particles 162 are added to the conveyed weighting agent particles 152. When the released fine weighting agent particles 162 are commingled on the conveyance mechanism with the coarse particle group 152, it is understood by those of skill in the art that the quantity of fine weighting agent particles present in the mixture is within the API or similar standard for weighting agent. That is, the fine weighting agent particles 162 are less than 30% of the mixture 172 by weight.

The mixture of fine weighting agent particles and coarse weighting agent particles 172 is then subjected to an additional classifier where the particles are classified 180, a second time, into a fine particle group 184 and a coarse particle group 182. In general, the particles in the coarse particle group 182 have a particle size greater than the acceptable minimum diameter while the particles in the fines particle group 184 have a particle size less than the acceptable minimum diameter. The fine particle group 184 is collected in a fines collection area 190 while the coarse particle group 182, having a sufficiently smaller quantity of fines than the maximum specified by the API standard, is separately collected 192 and the collected coarse weighting agent 194 is packaged 195. In the second classifying step 180, preferably no more than 15% of the coarse particle group 182 includes misclassified fines particle group 184. Also, preferably no more than 2% of the fines particle group 184 includes misclassified coarse particle group 182.

In a second embodiment of the process, also shown in FIG. 3, the cyclonically separated coarse weighting agent particles 132' are collected 192, rather than conveyed and commingled with the fine weighting agent particles. The collected coarse weighting agent particles 194 may be packaged 195. The packaged coarse weighting agent product will have fewer fines as a percentage of weight than the standard weighting agent product described in the prior art because the fines weighting agent group will not be periodically added back into the coarse weighting agent group. Thus, a higher quality weighting agent product having fewer fines is produced.

Figure 4:
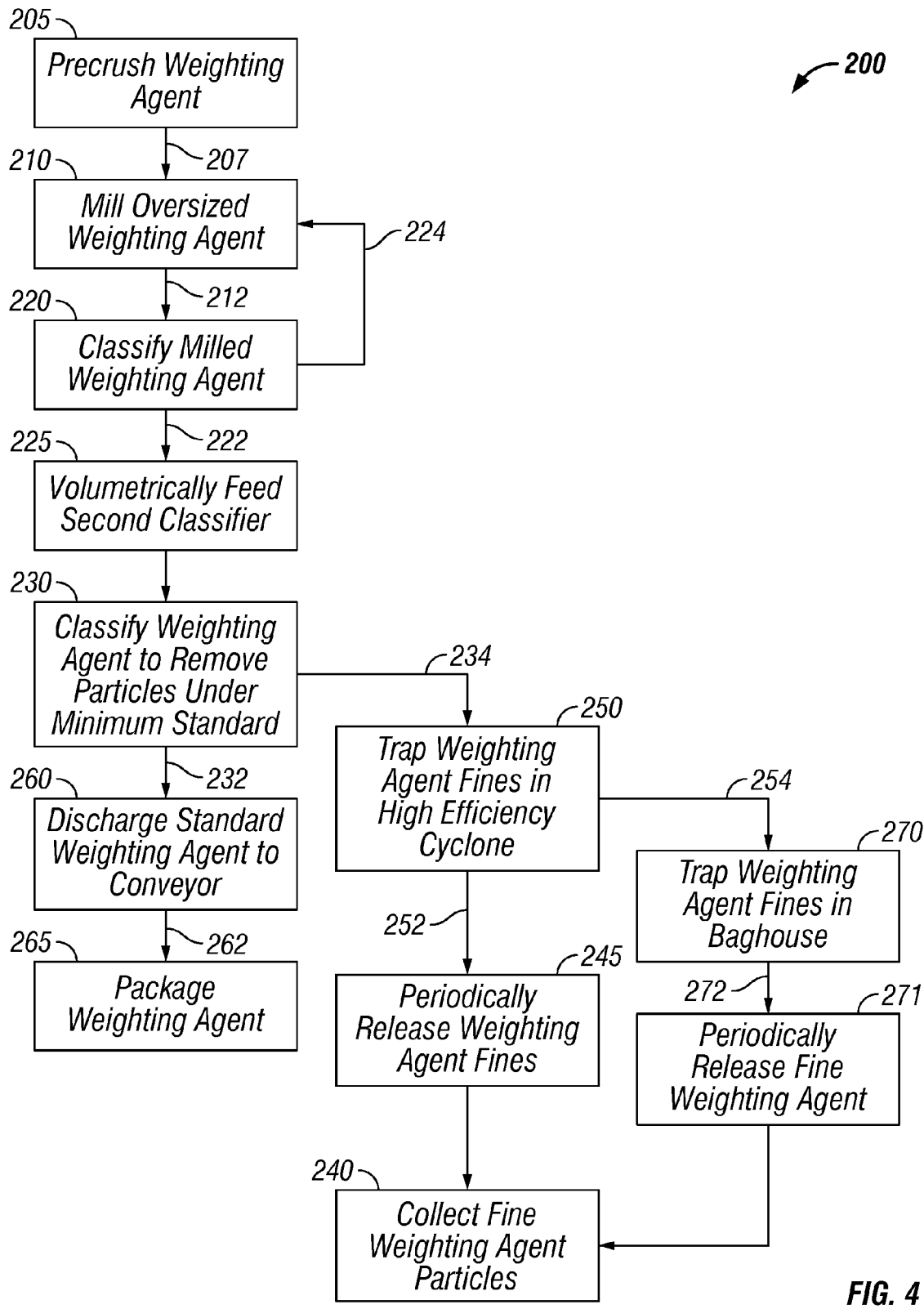
FIG. 4 is a flow chart showing an alternative method of harvesting weighting agent fines from a production process.

Referring to FIG. 4, in a third embodiment of the process, the weighting agent is milled 210 to a standard size. A precrushing step 205 may also be included to reduce the size of weighting agent pieces 207 that are fed into the mill. Milled weighting agent particles are classified by size 220, with the particles that are larger than the maximum acceptable size 224 remaining in the mill for further crushing 210. The smaller particles 222 from the mill classifier 220 are directed toward a second classifying step 230. In the second classifying step 230, the smaller particles 222 are classified again, this time according to a minimum size. In general, a coarse particle group 232, having a particle size greater than an acceptable minimum diameter, are separated from a fines particle group 234, having a particle size less than the acceptable minimum diameter.

In the second classifying step 230, preferably no more than 15% of the coarse particle group 232 includes misclassified fines particle group 234. Also, preferably no more than 2% of the fines particle group 234 includes misclassified coarse particle group 232. Thus, the second classifying step 230 results in a coarse particle group 232 meeting American Petroleum Institute specifications even without additional removal of fines particle group 234 members.

A volumetric feeding step 225 may be included to introduce smaller particles 222 to the second classifying step 230. In the volumetric feeding step 225, smaller particles 222 are released to the second classifying step 230 at a controlled flow rate equal to that at which the second classifier works efficiently and has an error rate with respect to classification that is equal to or less than the misclassification error rate previously discussed.

From the second classifying step 230, the fines particle group 234 is directed to a high efficiency cyclone where the weighting agent fines are trapped 250 and temporarily accumulated. In a manner similar to the cyclone previously described, the trapped fines particle group 252 is periodically released 245. A group of ultra-fine particles 254 does not settle to the bottom of the high-efficiency cyclone, but is directed to a baghouse where the ultra-fine particles are trapped 270. The trapped ultra-fine particles 272 may be separately collected or periodically released 271 and commingled with the fines particle group periodically released from the high-efficiency cyclone. The fines particle group and ultra-fine particles are then collected 240 for further processing.

The members of the ultra-fine particle group 272 caught in the baghouse filters in the filtering step 270 undergo a periodic releasing step 271. In the releasing step 271, a majority of the trapped ultra-fine particle group 272 are removed from the filter and directed to the fine collection area 240. Such removal is typically by introducing sudden linear motion to the filter to release the fine particles from the filters. The particles typically drop to a hopper below the filters and are then directed to the collection area. Removal of the fine particle group 272 from the baghouse may be by other means such as a vacuum as well as types of motion imparted to the filters other than that previously described.

After the second classifying step 230, the coarse particle group 232 and the small segment of the misclassified fine particle group 234, undergo a discharging step 260. In the discharging step 260, the coarse and misclassified fine particle groups 232 and 234 are released onto a conveyance mechanism. The group 252 may be released onto a conveyor in batches or continuously.

The discharged coarse particle group 262 is then packaged in a packaging step 265. Such packaging may be any means sufficient for storing and shipping the weighting agent particles. It should once again be noted that the weighting agent particles being packaged in this step 265 have at least 85% of the weighting agent particle population falling within the range between the acceptable minimum diameter and the acceptable maximum diameter. Less than 15% of the weighting agent particle population has a particle size less than the acceptable minimum diameter.

Figure 5:
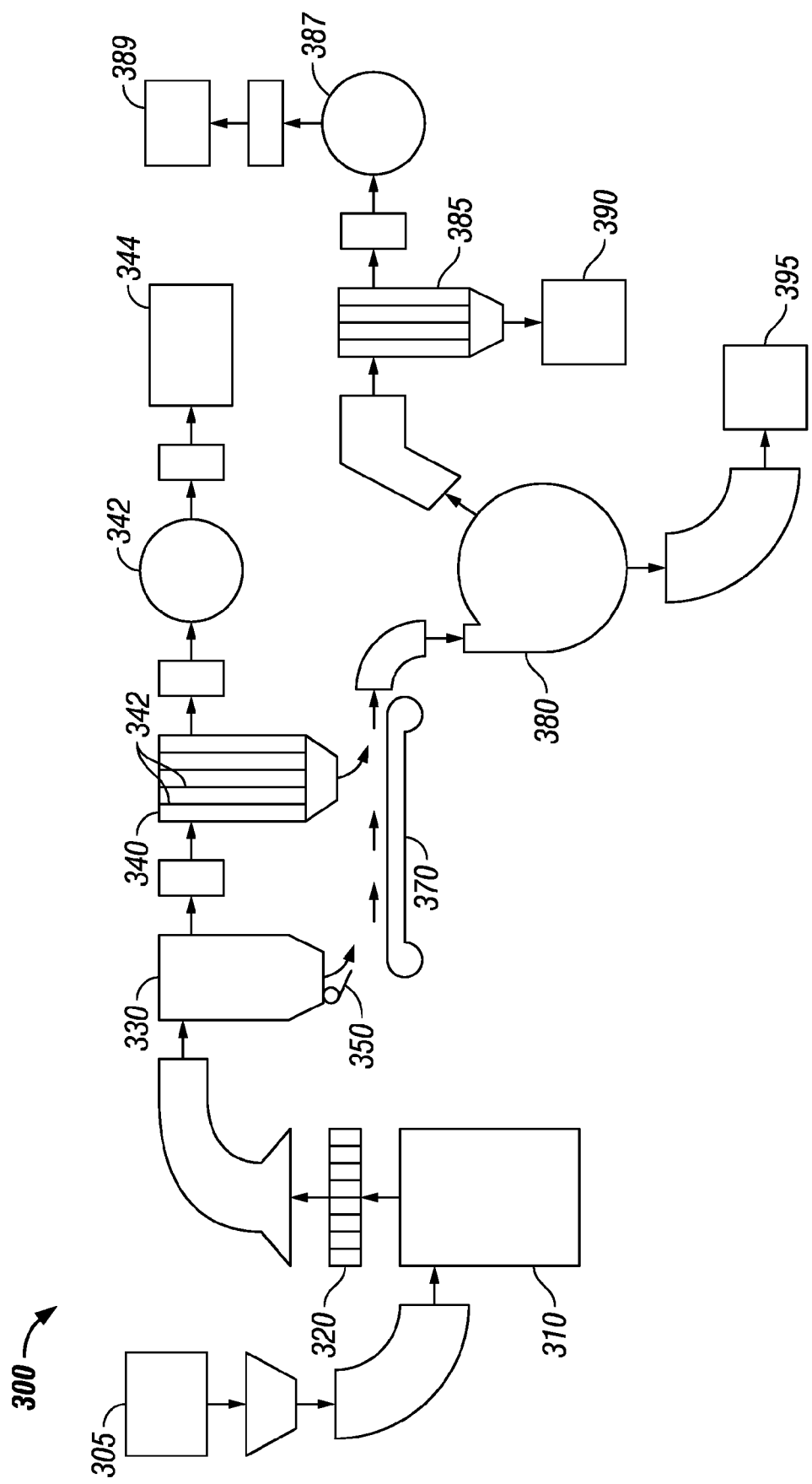
FIG. 5 is a schematic of an equipment layout to harvest weighting agent fines from a production process.
Figure 6:
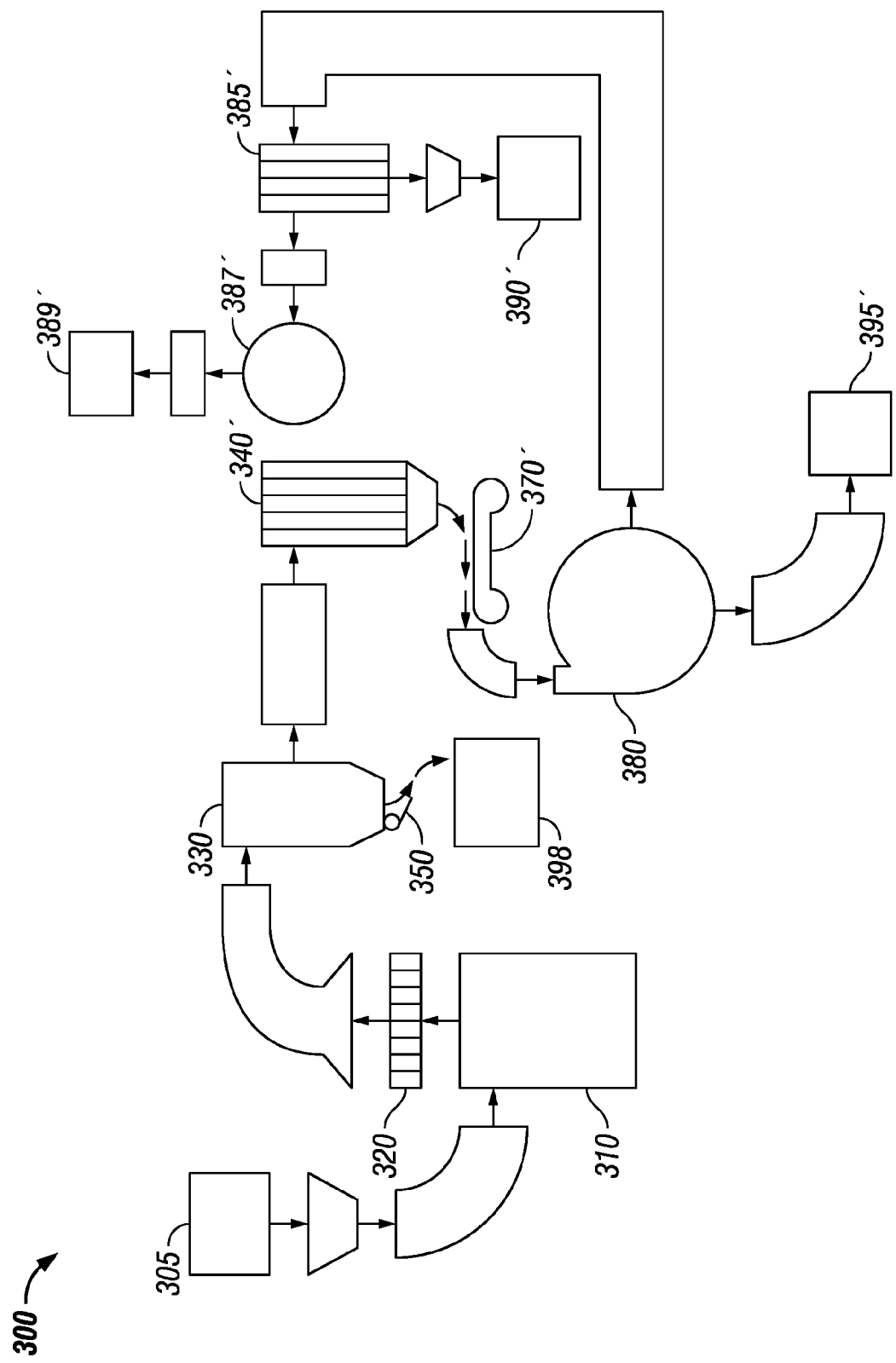
FIG. 6 is a schematic of an alternative equipment layout to harvest weighting agent fines from a production process.
Figure 7:
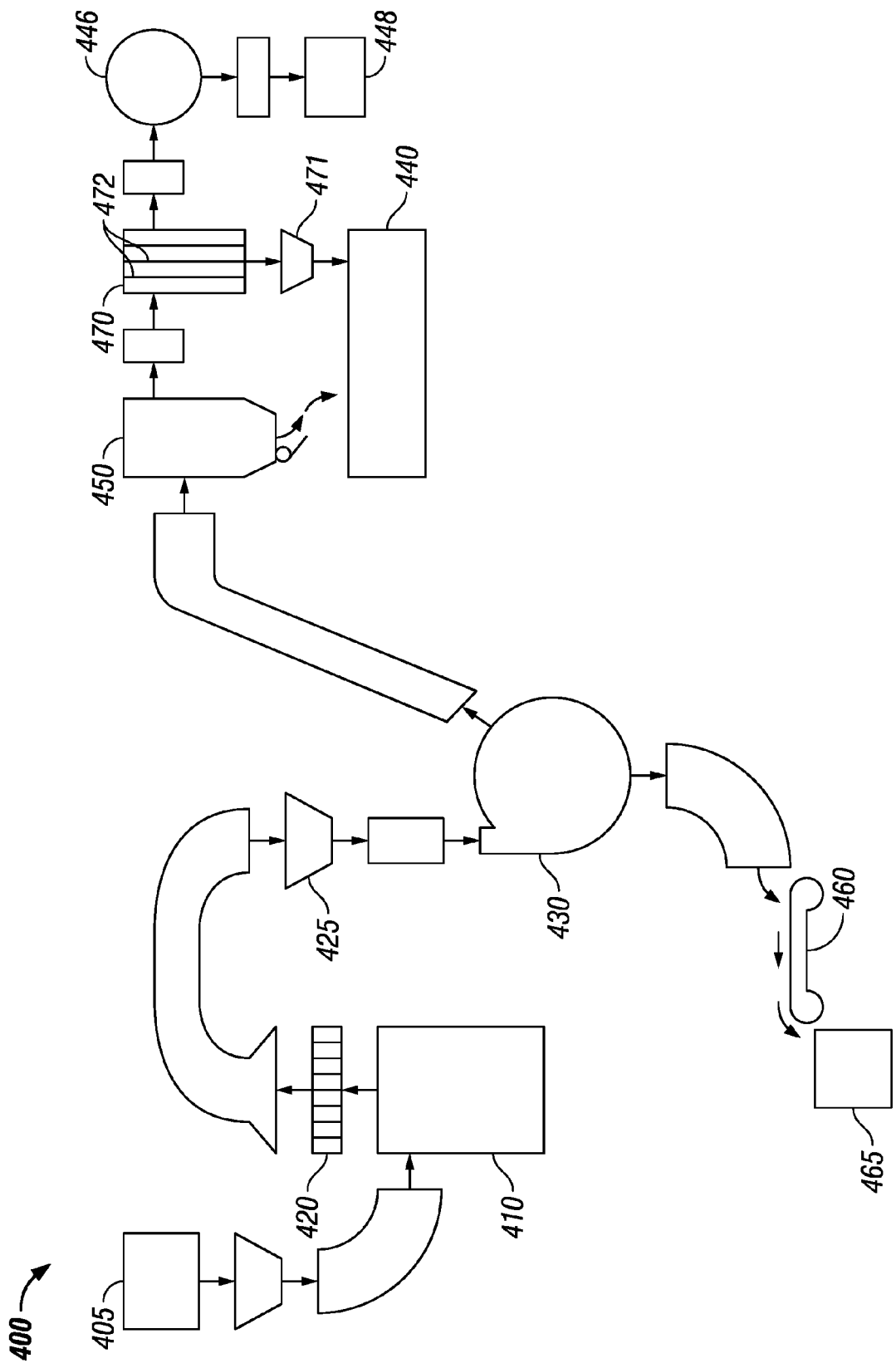
FIG. 7 is a schematic of an alternative equipment layout to harvest weighting agent fines from a production process.

Configurations of a system 300, 400 for harvesting weighting agent fines for further use are depicted in FIGS. 5-7. For each configuration, the system 300, 400 for harvesting fines from a commercial-grade weighting agent process includes a mill 310, 410, a first classifier 320, 420, a second classifier 380, 430, and a fines particle group collection area 390, 440.

Referring to FIG. 5, in a first configuration of system 300, the mill 310 is operable to reduce the size of weighting agent particles received therein. The weighting agent particles in the mill 310 are reduced in size such that the diameter of the particle, or the particle size, is less than the acceptable maximum diameter. Oversized particles that have not yet been ground sufficiently to reach the maximum acceptable particle size are retained in the mill 310 and continue to be pulverized until the particle size is equal to or less than the acceptable maximum diameter.

The mill 310 may be any type of mill that can sufficiently reduce particle size. Roller mills have proven to be especially suited for performing such particle reduction.

A precrusher 305 may be included before the mill 310 to reduce the size of weighting agent pieces to a more uniform size and to increase the performance of the mill 310.

The first classifier 320 is directly fed from the mill 310 and, typically, is integral to the mill 310. The first classifier 320 separates weighting agent particles having a particle size less than the acceptable maximum diameter from the oversized weighting agent particles. This standard may be dictated by a standard setting organization. As previously stated, the oversized weighting agent particles remain in the mill 310 for additional pulverization.

The particles that have a particle size equal to or less than the acceptable maximum diameter are directed from the first classifier 320 to a cyclone 330. In the cyclone 330, the particles are subjected to strong centrifugal forces causing the heavier particles to settle to the bottom of the cyclone 330 while the fine particles are carried with air currents to a first baghouse 340.

The particles that settle to the bottom of the cyclone 330 are primarily those particles having a particles size between the acceptable minimum and maximum sizes. However, some quantity of fine particles also are swept to the bottom of the cyclone 330 or are attached to the heavier particles that settle to the bottom. The bottom of the cyclone 330 may be equipped with a rotary air lock valve or a dual flapper gate valve 350 to periodically release the settled particles onto a conveyor mechanism 370.

The fine particles that are carried to the first baghouse 340 are trapped in the bag-like filters 342 located therein. Periodically, these filters 342 are subjected to a sharp, sudden force thereby shaking the fine particles from the filter surface. The fine particles may be reintroduced to the larger particles on the conveyor mechanism 370. Such reintroduction is controlled so that the overall quantity of fine particles within the mixture of fine and large particles is within predetermined standards.

The mixture of particles on the conveyor 370 are introduced to a second classifier 380. In the second classifier 380, a fines particle group, in which no more than 2% of the particles have a particle size greater than the acceptable minimum particle size, are directed to a second baghouse 385. The fines particle group may then be released from the second baghouse 385 in the same manner that fine particles are released from the first baghouse 340 and collected in a fines collection area 390.

From the second classifier 380, a coarse particle group, in which no more than 15% of the group are less than the acceptable minimum particle size, are directed to a coarse particle group collection area 395 where it may be packaged.

Referring to FIG. 6, in a second configuration of system 300, the first classifier 320 is fed directly from the mill 310. From the first classifier 320, the particles having a particle size less than the acceptable maximum diameter are directed to the cyclone 330. In the cyclone 330, the larger particles settle to the bottom and are periodically released directly to a coarse particle collection area 398.

The fine particles that do not settle to the bottom of the cyclone 330 are directed to the first baghouse 340'. As previously described the fines collected in the first baghouse 340' are periodically released. The fine particles that are released from the first baghouse 340' are directed, via a conveyance mechanism 370', to the second classifier 380. Thus, in this configuration, only the fines particle group is subjected to a second classification step.

The second classifier 380 is used to remove misclassified coarse particles from the fines particle group. Particles having a particle size greater than the acceptable minimum particle size are directed to a second coarse particle collection area 395'.

The particles having a particle size less than the acceptable minimum particle size are directed from the second classifier 380 to a second baghouse 385'. The fines particle group may then be released from the second baghouse 385' in the same manner that fine particles are released from the first baghouse 340' and collected in a fines collection area 390'.

As previously explained, the fines particle group should have no more than 2% of the particles with a particle size greater than the acceptable minimum particle size. The coarse particle group should have no more than 15% of the particles with a particle size less than the acceptable minimum particle size.

Referring to FIG. 7, in a third configuration of system 400, the first classifier 420 is fed directly by the mill 410 with which it is integrated. A precrusher 405 may be included before the mill 410 to provide uniform weighting agent pieces to the mill 410.

From the first classifier 420, the particles that have a particle size equal to or less than the acceptable maximum diameter are directed from the first classifier 420 to a second classifier 430. The second classifier 430 separates the particles having a particles size less than the standard acceptable minimum particle size from those particles that are equal to or larger than the minimum standard.

The system 400 may also include a volumetric feeder 425 between the first classifier 420 and the second classifier 430. The volumetric feeder 425 may be used to control the rate at which weighting agent particles are fed into the second classifier 430. Such control may be achieved by a hopper releasing weighting agent particles in a constant stream of predetermined volume flow rate or periodically releasing a predetermined volume of weighting agent particles into the second classifier 430.

After leaving the second classifier 430, a coarse particle group, having a particle size in the range between the minimum particle size, as determined by the second classifier 430, and the maximum particle size, as determined by the first classifier 420, has been substantially separated from both oversized and undersized particles. The second classifier 430 should be operable to separate at least 50% of the fines particle group, having a particle size less than the acceptable minimum diameter, from all of the weighting agent particles introduced to the classifier 430. The coarse particle group may include a segment of up to 15% of fine particles.

The coarse particle group is released to a conveyance mechanism 460, from which it is directed to a coarse particle collection area 465. As will be described, the coarse particle collection area 465 may include a means for packaging the coarse particle group for distribution.

The fines particle group is directed to a high-efficiency cyclone 450. The high-efficiency cyclone 450 is operable to subject the fines particle group to strong centrifugal forces, causing the larger of the fines particle group to settle to the bottom of the cyclone 450. The settled fines particle group at the bottom of the high-efficiency cyclone 450 may be periodically released to a fines collection area 440.

From the high-efficiency cyclone, ultra-fine particles are swept to a baghouse 470 and trapped in the bag-like filters 472. The ultra-fine particles typically have a particle size that is less than a predetermined minimum particle size to be exhibited by the fines particle group. Periodically, the filters 472 are subjected to a sharp, sudden force sufficient to release the ultra-fine particles from the filter surface. The ultra fine particles may be reintroduced to the fines particle group through a hopper or a second volumetric feeder 471. The ultra-fines particles may be commingled with the fines particle group in predetermined ratios and collected in the fines collection area 440. Alternatively, the ultra-fine particles may be separately collected in an ultra-fines particle collection area.

Both the high-efficiency cyclone 450 and the baghouse 470 may release the weighting agent product to a conveyance means (not shown) where the fines particle group and the ultra-fines particles are commingled before being directed to the fines collection area 440.

To assist transport of the weighting agent particles through the system 400, both gravity and air currents are utilized. The particle-bearing air must be filtered and otherwise treated to prevent weighting agent particles from being expelled into the atmosphere as it reaches the end of the system 400. The air flowing through the baghouse 470 is typically released to the air after also flowing through a centrifugal exhauster 448 and a silencer 446.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A method for harvesting weighting agent fines from a commercial-grade weighting agent production process comprising:

milling weighting agent into a plurality of weighting agent particles;

classifying milled weighting agent in a first classifier to separate weighting agent particles having a particle size less than an acceptable maximum diameter for commercial-grade weighting agent from weighting agent particles having a particle size greater than the acceptable maximum diameter for commercial-grade weighting agent;

discharging weighting agent particles having a particle size less than the acceptable maximum diameter for commercial-grade weighting agent into a cyclone;

cyclonically removing a portion of fine weighting agent particles from larger weighting agent particles, wherein the fine weighting agent particles have a particle size below an acceptable minimum diameter for commercial-grade weighting agent;

trapping the fine weighting agent particles in a baghouse;

releasing the fine weighting agent particles to a second classifier;

classifying the released weighting agent particles into a coarse particle group and a fines particle group based on particle size, wherein more than 98% of the weighting agent particles in the fines particle group have a particle size less than the acceptable minimum diameter for commercial-grade weighting agent and less than 15% of the weighting agent particles in the coarse particle group have a particle size less than the acceptable minimum diameter for commercial-grade weighting agent.

2. The method of claim 1, further comprising:

collecting the larger weighting agent particles from the cyclone.

3. The method of claim 1, further comprising:
discharging the larger weighting agent particles from the cyclone to commingle with the fine weighting agent particles before the second classifying step;
releasing the larger weighting agent particles with the fine weighting agent particles to the second classifier.

4. The method of claim 1, further comprising:
packaging the coarse particle group.

5. The method of claim 4, further comprising:
packaging the fine particle group.

6. The method of claim 1, further comprising:
precrushing weighting agent before the milling step.

7. A method for harvesting weighting agent fines for further processing from a commercial-grade weighting agent production process comprising:
milling weighting agent into a plurality of weighting agent particles;
classifying the milled weighting agent in a first classifier to separate weighting agent particles having a particle size less than an acceptable maximum diameter for commercial-grade weighting agent from weighting agent particles having a particle size greater than the acceptable maximum diameter for commercial-grade weighting agent;
discharging weighting agent particles having a particle size less than the acceptable maximum diameter to a second classifier;
classifying the weighting agent particles having a particle size less than the acceptable maximum diameter into a coarse particle group and a fines particle group based on particle size, wherein more than 98% of the weighting agent particles in the fines particle group are below an acceptable minimum diameter for commercial-grade weighting agent and less than 15% of the weighting agent particles in the coarse particle group are below the acceptable minimum diameter for commercial-grade weighting agent;
collecting the coarse particle group in a coarse particle collection area;
discharging the fines particle group to a high-efficiency cyclone;
cyclonically removing ultra-fine particles from the fines particle group, wherein the ultra-fine particles have a particle size less than a predetermined minimum particle size for the fines particle group;
collecting the ultra-fine particles in a baghouse;
releasing the fines particle group to a fines particle group collection area.

8. The method of claim 7, further comprising:
precrushing weighting agent prior to the milling step to form a plurality of weighting agent particles of a substantially uniform particle size.

9. The method of claim 8, further comprising:
introducing the precrushed weighting agent particles to the milling step in at least one batch of predetermined quantity.

10. The method of claim 7, further comprising:
volumetrically feeding discharged weighting agent particles to the second classifier.

11. The method of claim 7, further comprising:
periodically releasing ultra-fine particles from the baghouse to the fines particle collection area.

12. The method of claim 7, further comprising:
periodically releasing ultra-fine particles from the baghouse to an ultra-fine particle collection area.

13. A system for harvesting weighting agent fines for further processing during production of commercial-grade weighting agent comprising:
a mill operable to reduce weighting agent particles to a particle size less than an acceptable maximum diameter for commercial-grade weighting agent;
a first classifier attached to the mill, wherein the first classifier is operable to separate the weighting agent particles having the particle size of less than the acceptable maximum diameter for commercial-grade weighting agent from remaining weighting agent particles;
a cyclone operable to separate a fines particle group from a coarse particle group, wherein at least 70% of the coarse particle group includes particles having a particle size greater than an acceptable minimum diameter for commercial-grade weighting agent and less than the acceptable maximum diameter for commercial-grade weighting agent;
a first baghouse to trap the cyclonically separated fine particle group;
a second classifier operable to separate at least 50% of the fines particle group from the remaining weighting agent, wherein the fines particle group has a plurality of weighting agent particles with a particle size less than an acceptable minimum diameter for commercial-grade weighting agent;
a second baghouse for trapping the fines particle group from the second classifier;
a collection area for the fines particle group in communication with the second baghouse;
a coarse particle collection area for collecting the coarse particle group from the second classifier, wherein the course particle group has at least 85% of weighting agent particles greater than the acceptable minimum diameter for commercial-grade weighting agent.

14. The system of claim 13, further comprising:
a conveyance mechanism operable to commingle the cyclonically separated fines particle group and the coarse particle group prior to the second classifier.

* * * * *